J. L. McKISSOCK.

SKIRT MARKER.

APPLICATION FILED NOV. 17, 1909.

Reissued Aug. 9, 1910. 13,142.

Witnesses:-

Samuel Pagne

O. H. Butler

Inventor

J. L. McKissock.

by H. C. Evarts & Co.

Attorneys.

THE NORRIS PETERS CO., WASHINGTON, D. C.

UNITED STATES PATENT OFFICE.

JOHN L. McKISSOCK, OF PITTSBURG, PENNSYLVANIA, ASSIGNOR TO MARGARET McKISSOCK, OF PITTSBURG, PENNSYLVANIA.

SKIRT-MARKER.

13,142. Specification of Reissued Letters Patent. Reissued Aug. 9, 1910.

Original No. 919,921, dated April 27, 1909, Serial No. 450,721. Application for reissue filed November 17, 1909. Serial No. 528,847.

*To all whom it may concern:*

Be it known that I, JOHN L. McKISSOCK, a citizen of the United States of America, residing at Pittsburg, in the county of Allegheny and State of Pennsylvania, have invented a certain new and useful Improvement in Skirt-Markers, of which the following is a specification.

This invention relates to skirt markers and the object thereof is to provide a device of such class in a manner as hereinafter set forth and claimed whereby a skirt can be accurately marked to enable the fitter to obtain an accurate measurement for reducing the length of the skirt.

A further object of the invention is to provide a device of the class referred to with means in a manner as hereinafter set forth and claimed for adjustably supporting a resilient guide employed for properly positioning a circumferentially-extending line upon a skirt and whereby by the additional use of a vertically-disposed measure and marker a fitter can accurately place on the skirt another circumferentially-extending line which constitutes a guide line for the cutting and shortening of the skirt.

Further objects of the invention are to provide a marker of the class referred to which shall be simple in its construction, strong, durable, readily set up in operative position, inexpensive to manufacture, advantageously used by dressmakers, ladies' tailors, and furthermore adapted for use for fitters in the skirt departments of shops or stores.

With the foregoing and other objects in view, the invention consists in the novel construction, combination and arrangement of parts as hereinafter more specifically referred to and illustrated in the accompanying drawings, wherein is shown the preferred embodiment of the invention, but it is to be understood that changes, variations and modifications can be resorted to which come within the scope of the claims hereunto appended.

Figure 1:
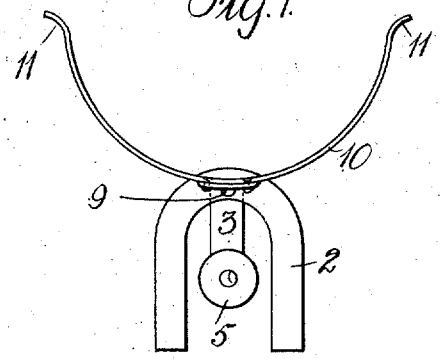
Figure 2:
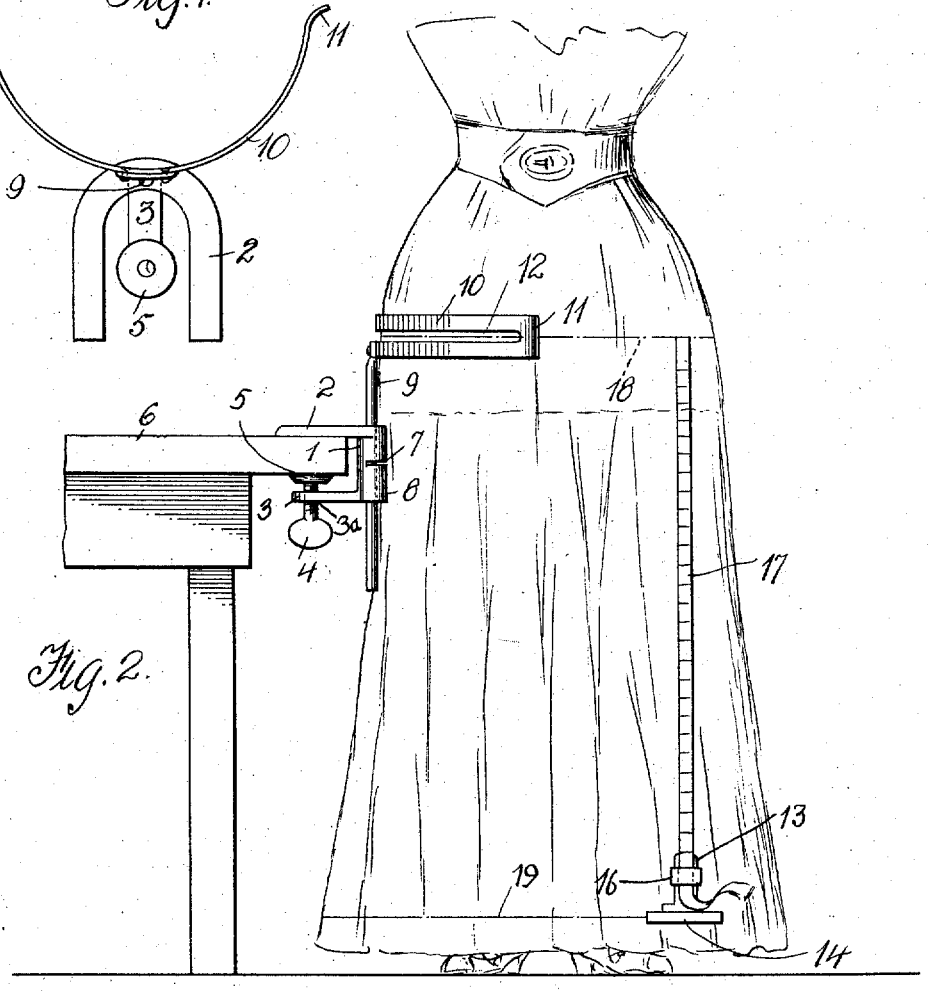
Figure 3:
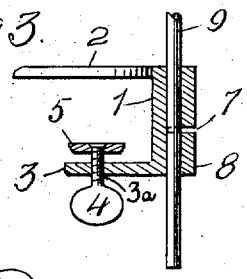
Figure 4:
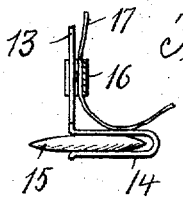

In the drawings, wherein like reference characters denote corresponding parts throughout the several views, Figure 1 is a top plan view of a skirt marking device in accordance with this invention, Fig. 2 is a side elevation of the same, showing the adaptation of the device when marking a skirt. Fig. 3 is a vertical sectional view of the bracket clamp, a detail of the device, also showing a portion of the vertically adjustable supporting rod, and Fig. 4 is a side elevation partly in section of a chalk and tapeholder used in connection with the device.

Referring to the drawings in detail, a skirt marking device in accordance with this invention includes a bracket clamp consisting of a hollow tubular body portion 1 provided at one end with a pair of arms 2 extending in parallelism with respect to and spaced from each other and at its other end with an arm 3 which projects in a plane between the arms 2. The arms 2 as well as the arm 3 extend at right angles with respect to the body portion 1. The free end of the arm 3 is formed with a screw-threaded aperture $3^a$ through which extends a set screw 4 having secured to its inner end a flat head 5 adapted to engage one face of a support and in connection with the arms 2 fixedly secure the bracket clamp to the support. The support is indicated by the reference character 6 and as shown has its upper face engaged by the arms 2 and its lower face by the head 5. The body portion 1 intermediate its ends is partially slitted as at 7 whereby the lower part 8 of the body portion 1 can be slightly moved with respect to the upper portion when the bracket clamp is secured to the support. The purpose of slightly moving the lower part 8 of the body portion 1 will be presently referred to.

Extending through the body portion 1 of the bracket clamp is a vertically-adjustable rod 9 which is held in its adjusted position through the medium of the lower part 8 of the body portion in connection with the arm 3 and screw 4 when the bracket clamp is secured to the support 6. In this connection it will be stated that when the lower part 8 of the body portion 1 is caused to slightly move or shift due to the securing of the arm 3 to the support 6 through the medium of the screw 4, the said lower part 8 of the body portion 1 holds the rod 9 in its adjusted position. To allow for the adjusting of the rod 9, it necessitates the loosening of the screw 4 so as to permit the lower portion 8 of the body portion 1 to spring backward to its normal position and when in such position the rod 9 can be shifted upwardly or downwardly as occasion so requires. Fixed to the upper end of the rod 9 is a semi-cylindrical resilient guide member 10 having flared ends 11 and also provided with an elongated slot 12 which extends from a point in close proximity to one end to a point in close proximity to the other end of said member. By providing the guide 10 with the slot 12, a piece of chalk or soapstone can be inserted through the slot and moved from end to end thereof so as to draw a line upon the skirt. The resilient guide 10 when in operative position is adapted to partially surround the wearer of the skirt, and furthermore automatically conforms to the shape of the wearer so that the said member will snugly fit when in operative position.

It will be assumed that it is desired to shorten a skirt. The wearer of the skirt positions herself in engagement with the resilient guide member, the latter partially surrounding the wearer and snugly fitting the wearer's hips, such position of the said guide member allowing a true line to be drawn upon the skirt. After the guide member is in position to snugly fit the hips of the wearer of the skirt, the fitter takes the marking medium, such as a piece of chalk or soapstone and draws a line from one end to the other end of the slot, or the length desired, the wearer then slightly turns in the stencil and the fitter continues to mark until the line is completed, the skirt then being provided with a circumferentially-extending line at the proper point upon the hip portion of the skirt. The skirt is then removed from the wearer and a combined chalk and tape line holder employed for measurement for reducing the length of the skirt. The holder as illustrated comprises a metallic plate 13 having one end thereof bent as at 14 to hold a marking medium such as a piece of chalk or soapstone 15. The opposite end of the plate 13 is provided with guide 16 for the end of a tape measure 17.

It will be assumed that two inches are to be removed from the lower edge of the skirt. The distance between the slot 12 and the floor line is ascertained, and for example, if the distance is thirty inches, two inches are deducted from such distance and the chalk holder is set upon the tape measure at the twenty-eighth inch graduation. One end of the tape measure is then placed upon the hip line at the hip portion of the skirt, such line being indicated by the reference character 18, the marking medium within the holder is then employed to describe a line in proximity to the lower edge of the skirt, such line being indicated by the reference character 19. As the distance between the lines 18 and 19 is equal all around the skirt, the skirt can be cut upon the line 19 and after being cut it will hang properly, and furthermore present a proper appearance with respect to the upper portion of the skirt.

The stand or support 6 can be portable so that the skirt marking device can be readily transported from point to point when occasion so requires.

What I claim is:

1. In a skirt marking device the combination with a stand, of a clamp secured thereto, said clamp comprising a tubular body, arms extending at right angles with respect to each end of said body, a set screw adjustably-mounted in one of said arms and cooperating with the other of said arms for securing said clamp to said stand, a rod adjustably-mounted in said tubular body, said tubular body being slitted to permit of the lower part of said body binding said rod therein, and a semi-cylindrical resilient guide member fixed upon the upper end of said rod, said guide member having flared ends and the slot formed therein extending from a point in proximity to one end of said member to a point in proximity to the other end thereof, substantially as described.

2. In a skirt marking device the combination with a stand, of a clamp, a vertical rod adjustably-mounted in said clamp, a semi-cylindrical slotted resilient guide member carried by the upper end of said rod, and means in connection with said clamp for simultaneously fixing said clamp to said stand and said rod to said clamp.

3. A skirt marking device comprising a clamp, a rod adjustably-mounted in said clamp, and a slotted resilient guide member fixed upon the upper end of said rod.

4. A skirt marking device comprising a clamp, a rod adjustably mounted in said clamp, and a resilient guide carried by said rod and automatically adjusting itself to the shape of the wearer of the skirt when in engagement therewith and automatically returning to its original shape when removed.

5. In a skirt marking device, a guide normally semi-cylindrical in contour and adapted to partially surround and automatically conform to the shape of the wearer of the skirt when the guide is applied and to automatically return to its original shape when removed, said guide provided with an uninterrupted slot extending in the direction of the length thereof.

6. In a skirt marking device, a guide normally semi-cylindrical in contour and adapted to partially surround and automatically conform to the shape of the wearer of the skirt when the guide is applied and to automatically return to its original shape when removed, said guide provided with an uninterrupted slot extending in the direction of the length thereof, and said guide further having flaring free ends.

In testimony whereof, I affix my signature in the presence of two witnesses.

JOHN L. McKISSOCK.

Witnesses:

MARY M. HEDDEN,
KARL H. BUTLER.